United States Patent [19]
Brosh et al.

[11] 3,993,150
[45] Nov. 23, 1976

[54] ECONOMICAL WEIGHING APPARATUS EMPLOYING A CANTILEVER BEAM STRUCTURE

[75] Inventors: Amnon Brosh, Montvale, N.J.; Jacob Wasserman, Bronx, N.Y.

[73] Assignee: Kulite Semiconductor Products, Inc., Ridgefield, N.J.

[22] Filed: May 19, 1975

[21] Appl. No.: 578,637

[52] U.S. Cl. .............................. 177/211; 177/165; 177/229
[51] Int. Cl.² .................. G01G 3/14; G01G 23/14; G01G 3/08
[58] Field of Search ........... 177/211, 165, 229, 255, 177/DIG. 5, DIG. 9; 73/141 A

[56] References Cited
UNITED STATES PATENTS

| 2,472,047 | 5/1949 | Ruge | 73/141 A |
| 3,306,382 | 2/1967 | Espenschied et al. | 177/165 UX |

*Primary Examiner*—George H. Miller, Jr.
*Attorney, Agent, or Firm*—Arthur L. Plevy

[57] ABSTRACT

An economical scale is disclosed which utilizes a cantilever beam having positioned thereon a transducer arrangement. The beam is coupled to a platform by means of a rod inserted into an aperture in a linear bearing; thus providing a force only in the axial direction, to enable the weighing of an object positioned at any location on the platform, with extreme accuracy.

9 Claims, 4 Drawing Figures

ECONOMICAL WEIGHING APPARATUS EMPLOYING A CANTILEVER BEAM STRUCTURE

BACKGROUND OF INVENTION

This invention relates in general to scales or weighing apparatus and more particularly to a scale adapted to measure moderately low weights or forces particularly useful in inventory control.

There are a plethora of requirements in the prior art for determining the weight or difference in weight of an object or the contents of a container.

For example, in an inventory control system for a bar operation, the manager would wish to determine the opening inventory of a plurality of whiskey bottles, each one of which may be partially full. He would also wish to know the contents of each bottle at the end of the working day. One technique of performing such control is to weigh the bottle and its contents by means of a scale. It can also be determined that density of different brands of liquor can vary and hence, the amount of liquor used can be determined by the difference in weight over a predetermined time. Each bottle to be weighed is set on a separate platform when not in use and the platform is coupled to a scale or weighing instrument. This technique would be applicable to all sorts of fungible goods and hence, the same approach could be used for weighing and monitoring the contents of any container as food stuffs, liquids other than alcoholic beverages and so on.

Basically, each bottle or container with its contents must be positioned at or on a scale location so that the use or depletion of the contents can be continuously monitored.

In the above example, a typical bar or liquor dispensing operation might wish to monitor the contents of One Hundred Fifty bottles and hence, one would require One Hundred Fifty separate scales and platform locations.

It should therefore be apparent that the cost of such scales should be relatively inexpensive.

It should also be apparent that the scale be capable of measuring low weights. For example, one might require a measurement within an accuracy of up to 1/10 of a liquid ounce, which might be equivalent to a few drops poured from the contents of a particular bottle. Thus, besides the function of economics, one must provide accuracy of measurement.

Since a bar or similar establishment can be busy and hectic, one must also provide such measurements even though a bottle is not exactly positioned at the center of the platform, but is placed back in any general position on the platform.

While many scales or weighing devices exist in the prior art, they are cumbersome, expensive and do not solve the problems attendant with such inventory control systems.

It is therefore an object of the present invention to provide an improved scale for weighing the contents of a container economically and with necessary accuracy.

BRIEF DESCRIPTION OF PREFERRED EMBODIMENT

A scale apparatus employs a platform which is coupled to a rod constrained to move in an axial direction relatively perpendicular to an object containing surface of said platform by means of a linear bearing having a rod accommodating aperture, one end of said rod coacting with an unrestrained end of a cantilever transducer, which responds to said axial rod motion to provide an output indicative of the weight of an object accommodated by said platform.

DETAILED DESCRIPTION OF FIGURES

Figure 1:
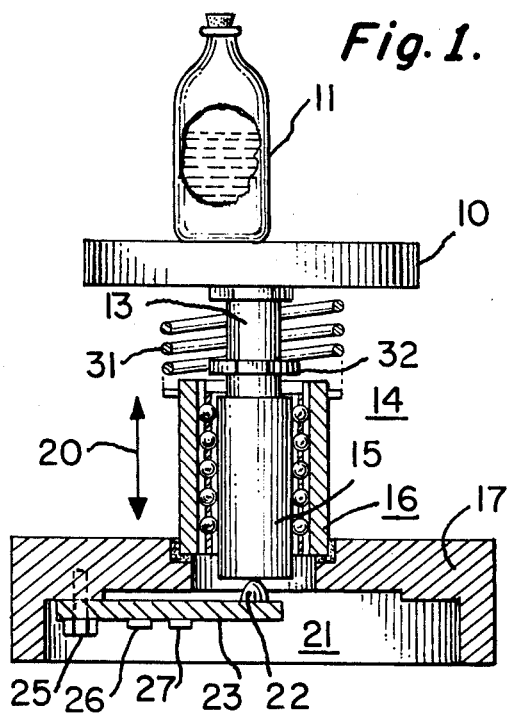
FIG. 1 is a side cross sectional view of a scale according to this invention.

Referring to FIG. 1, there is shown a platform 10 having positioned on a surface thereof, a bottle or container 11, the contents of which is to be monitored.

The platform 10 may be circular in shape or any other suitable configuration and is larger than the bottom area of the bottle 11 to allow a bartender or merchant to replace the bottle with ease and convenience. As indicated above, the contents 12 of the bottle 11 may be continuously used over an extensive period and one would wish, for purposes of inventory control, to monitor the use by weighing the same.

The platform 11 is coupled to a rod or shaft 13 which is positioned in the central aperture of a linear bearing housing 14.

The linear bearing 14 is a commercial component and basically is a cylindrical member having a central aperture where an inner cylinder as 15 rides against a plurality of ball or roller bearings positioned axially with an outer cylinder 16. The outer cylinder 16 of the linear bearing is coupled to a reference plane such as the base member 17 of the scale. In this manner, the outer bearing casing is fixed and the rod 13 as coupled to the inner sleeve is free to move only in an axial direction, as indicated by the arrow 20. The bearing 16 serves to hold the platform 10 in place while constraining motion only in the axial direction. Coupled within a central aperture of the base is a cantilever beam and transducer assembly 21. The end of the rod, near its geometric center is coupled to a projection 22 on the cantilever beam 23. The cantilever 23 is secured to the base by means of a screw, rivet or a weld 25 at one end thereof. Located on the underside of the beam are one or more strain gages 26 and 27 which are of the type providing a change in resistance according to the force or weight causing a bending of the cantilever beam 23.

The devices 26 and 27 are preferably piezoresistive transducers which exhibit a change in resistance according to the force applied to the beam. The piezoresistive effect is well known and is exhibited by semiconductor materials, such as silicon or germanium.

Basically, the cantilever beam 23 in conjunction with the gages 26 and 27 is a force or torque transducer and hence, the piezoresistors provide an output related to the applied force or weight. Due to the characteristics of such transducers, measurements with one-tenth of a fluid ounce are possible and practical.

It is, of course, understood that one could use other sensing elements or strain gages in lieu of the piezoresistive devices, as bonded wire strain gages, helical wrap around gages, metal foil gages, as well.

The piezoresistive gage enables accurate measurements and is simple to fabricate and apply to the cantilever beam 23. The beam 23 may be fabricated from a flexible metal, such as a steel, or steel alloy, Kovar or a number of other materials.

A spring 31 may be positioned as shown surrounding the top portion of rod 13 and secured between the bottom of the platform 10 and a stop nut or flange 32.

The flange or stop 32 acts as an overload stop and will prevent the rod from moving downwardly beyond the position of the stop 32 for excessive weights positioned in the platform 10 and prevent exceeding the elastic range of the cantilever beam 23. The spring 31 can be inserted as described, to remove some or all of the tare load. Hence, the spring 31 can be selected according to the weight of the container 11 without contents. Thus, the container 11, when empty, would counteract the force of the spring and present a null condition for the cantilever transducer 21.

As can be ascertained from FIG. 1, no matter where the container is placed on platform 10, the force transmitted to the cantilever is always axial due to the linear bearing.

Figure 2:
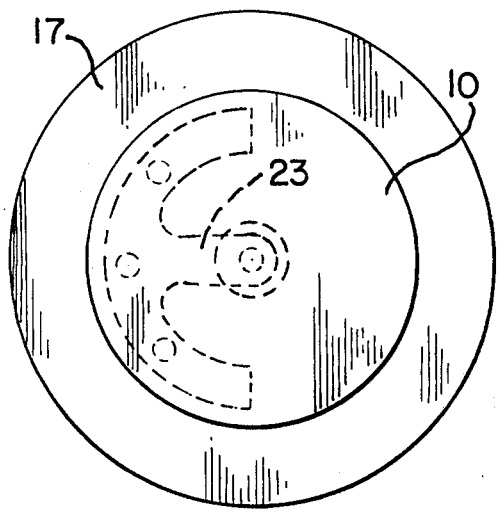
FIG. 2 is a top plan view of the scale.

FIG. 2 shows a top view of the platform 10 and base assembly 17. It is, of course, understood that rectangular, square or other geometric configurations could be employed as well.

Figure 3:
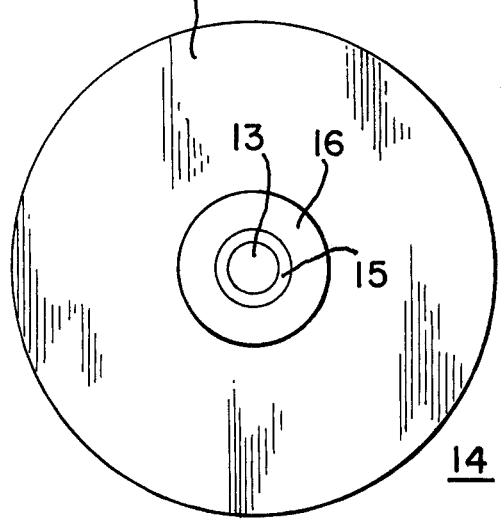
FIG. 3 is a top plan view of a linear bearing and rod used in the invention.

Referring to FIG. 3, there is a shown a top plan view of the rod 13 and the linear bearing 14. As indicated, the inner cylinder 15 of the bearing 14, has the rod 13 force-fit or otherwise secured thereto. The outer housing 16 of the bearing is retained in an aperture of the base member 17 of the scale (FIG. 1) and does not move. The inner member 15 and the rod 13 can move with extremely low friction in an axial direction (arrow 20 of FIG. 1), and such motion is, of course, ascertained by the bearing 14.

Figure 4:
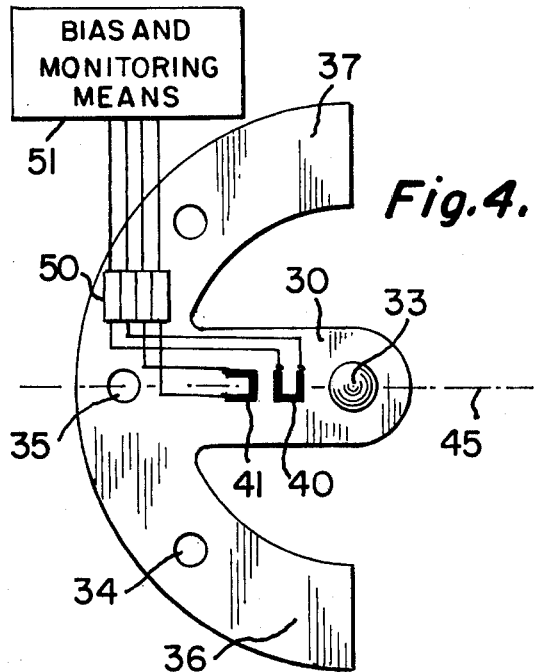
FIG. 4 is a bottom plan view of a cantilever beam transducer used in this invention.

Referring to FIG. 4, there is shown a bottom plan view of the cantilever assembly (as 23 of FIG. 1). Basically, the cantilever 30 is an extended beam of a flexible material as indicated above. In the configuration shown, the beam 30 is integrally fabricated from a sheet material, as by a stamping or cutting process and has two circular arms as 36 and 37 formed therewith and hence, assumes an "E" shaped appearance. The arms 36 and 37 are along the circumference of a semicircle which is selected according to the dimensions of the base member 17. The projection 33 (as 22 of FIG. 1), which coacts with the center of the rod (as 13 of FIG. 1) is shown and is a cusp like member to make point contact with the center of the rod.

The arms 36 and 37 have a number of apertures located thereon as 34 and 35 to accommodate a screw or bolt for securing the cantilever assembly to the base housing.

Located on the beam section 30 are two "U" shaped piezoresistive gages 40 and 41. The gage 40 is positioned with the arms of the "U" relatively perpendicular to the main axis 45 of the beam, while the arms of the gage 41 are relatively parallel to axis 45. Thus, by this orientation, one obtains an optimum response from both gages due to a force applied at projection 33 of the beam.

The gages 40 and 41 are preferably attached to the cantilever prior to the placement of leads. Accordingly, the gages 40 and 41 are glued or epoxied at the desired location on the cantilever 30. A set of tabs or terminals (shown as four in number) 50 are also glued on one or the other arms as 36 and 37. Once the gages 40 and 41 and the tab or terminal area 50 are so positioned, the leads from the gages to the terminal 50 are formed by an ultrasonic ball bonding process. This technique eliminates the manual connection of leads. Output leads are then directed to a bias and monitoring circuit 51. Since the gages 40 and 41 provide a change in resistance with applied force, the current through the gages varies according to force, as the resistance changes. This change in current is monitored and calibrated in terms of force and can be used by a computer or memory storage to continuously monitor the contents of an object, or the weight or force applied to the platform 10.

Hence, an extremely accurate and simply constructed scale is disclosed which is reliable, economical and has few moving parts and is useful in inventory control systems as well as other uses.

We claim:

1. Apparatus for measuring the weight of an object, comprising:
   a. a cantilever beam transducer having a fixed end secured to a reference plane and one end adapted to receive a force, said cantilever beam transducer having a force responsive element positioned on said beam near said end adapted to receive a force, and a terminal assembly positioned on said fixed end with electrical leads coupling said force responsive element to said terminal assembly and directed along the surface of said beam,
   b. a linear bearing positioned with respect to said one end of said cantilever beam, said bearing having a central aperture and an inner wall for moving axially with respect to said one end of said cantilever,
   c. a rod located within said aperture and having one end coacting with said one end of said cantilever, and
   d. means located at said other end of said rod for receiving an object to be weighed.

2. A scale apparatus for measuring the weight of a container and its contents, comprising:
   a. a platform and having a top surface adapted to receive said container,
   b. a rod coupled to the bottom surface of said platform and extending relatively perpendicular therefrom,
   c. a linear bearing having a central aperture and an inner wall, said aperture adapted to accommodate said rod to permit said rod to move only in a direction relatively perpendicular to said top surface of said platform, due to the movement of said inner wall of said bearing,
   d. a base member having a central aperture for accommodating said bearing,
   e. a cantilever transducer having one end secured to said base member and the other end coacting with said rod, whereby said transducer provides an output when deflected by said rod indicative of the weight of said container, said cantilever transducer having a force responsive element positioned thereon and located near said end coacting with said rod and a terminal assembly secured to said transducer at said end near said base member with electrical leads coupling said element to said terminal assembly and said leads directed along the surface of said beam.

3. The scale apparatus according to claim 2 wherein said cantilever transducer is of the type employing at least one piezoresistive gage located on a surface thereof closer to said end secured to said base member.

4. The scale according to claim 2 wherein said container and contents comprise a bottle containing an alcoholic beverage.

5. The scale according to claim 2 used in an inventory control system for fungible goods.

6. A scale apparatus, comprising:
   a. a platform for receiving a container or item to be weighed,
   b. a hollow base member having a relatively central aperture,
   c. a cantilever assembly having a base arm assembly rigidly secured to said housing within said hollow and a centrally extending beam arm positioned beneath said aperture and adapted to flex upon application of a force thereto, said central beam arm having at least one force responsive element positioned thereon,
   d. terminal block means positioned on said base arm assembly of said cantilever,
   e. electrical conductors coupling said force responsive element to said terminal block means and directed along the surface of said extending beam arm,
   f. a rod positioned within a linear bearing and having one end coupled to said platform and said other end coupled to said extending beam arm to permit said rod to exert a force on said beam when an object is placed on said platform, said linear bearing including an outer tubular member mounted on said base with said rod extending through said central aperture, and an inner tubular member coupled to said outer member for axial movement by means of a plurality of bearings with said rod coupled to said inner tubular member.

7. The apparatus according to claim 6 wherein said container is a bottle containing an alcoholic beverage.

8. The apparatus according to claim 6 further comprising a stop member positioned between said platform and said cantilever to restrain the movement of said rod beyond a predetermined distance.

9. The apparatus according to claim 8 further including a spring positioned about said rod and located between said platform and said stop, said spring selected to provide a force to said platform relatively equal to the weight of said container.

* * * * *